(12) United States Patent
Golden et al.

(10) Patent No.: US 11,281,375 B1
(45) Date of Patent: *Mar. 22, 2022

(54) OPTIMIZING FOR DATA REDUCTION IN A STORAGE SYSTEM

(71) Applicant: PURE STORAGE, INC., Mountain View, CA (US)

(72) Inventors: Christopher Golden, Emerald Hills, CA (US); Richard Hankins, San Jose, CA (US); Aswin Karumbunathan, San Francisco, CA (US); Naveen Neelakantam, Mountain View, CA (US); Neil Vachharajani, Menlo Park, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,719

(22) Filed: Jun. 28, 2019

Related U.S. Application Data (63) Continuation of application No. 14/980,632, filed on Dec. 28, 2015, now Pat. No. 10,346,043.

(51) Int. Cl.
 *G06F 3/06* (2006.01)

(52) U.S. Cl.
 CPC .......... *G06F 3/0608* (2013.01); *G06F 3/064* (2013.01); *G06F 3/067* (2013.01); *G06F 3/0638* (2013.01); *G06F 3/0661* (2013.01); *G06F 3/0689* (2013.01)

(58) Field of Classification Search
 None
 See application file for complete search history.

(56) References Cited

U.S. PATENT DOCUMENTS

| | | | |
|---|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Tracy C Chan (57) ABSTRACT

Intelligently compressing data in a storage array that includes a plurality of storage devices, including: prioritizing, in dependence upon an expected benefit to be gained from compressing each data element, one or more data elements; receiving an amount of processing resources available for compressing the one or more of the data elements; and selecting, in dependence upon the prioritization of the one or more data elements and the amount of processing resources available for compressing one or more of the data elements, a data compression algorithm to utilize on one or more of the data elements.

19 Claims, 7 Drawing Sheets

(56) References Cited

U.S. PATENT DOCUMENTS

| | | | |
|---|---|---|---|
| 6,085,333 A | 7/2000 | DeKoning et al. | |
| 6,195,024 B1 | 2/2001 | Fallon | |
| 6,309,424 B1 | 10/2001 | Fallon | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,643,641 B1 | 11/2003 | Snyder | |
| 6,647,514 B1 | 11/2003 | Umberger et al. | |
| 6,748,457 B2 | 6/2004 | Fallon et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,130,913 B2 | 10/2006 | Fallon | |
| 7,146,521 B1 | 12/2006 | Nguyen | |
| 7,161,506 B2 | 1/2007 | Fallon | |
| 7,181,608 B2 | 2/2007 | Fallon | |
| 7,321,937 B2 | 1/2008 | Fallon | |
| 7,334,124 B2 | 2/2008 | Pham et al. | |
| 7,352,300 B2 | 4/2008 | Fallon | |
| 7,358,867 B2 | 4/2008 | Fallon | |
| 7,376,772 B2 | 5/2008 | Fallon | |
| 7,378,992 B2 | 5/2008 | Fallon | |
| 7,395,345 B2 | 7/2008 | Fallon | |
| 7,415,530 B2 | 8/2008 | Fallon | |
| 7,417,568 B2 | 8/2008 | Fallon et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,090,936 B2 | 1/2012 | Fallon et al. | |
| 8,112,619 B2 | 2/2012 | Fallon et al. | |
| 8,200,887 B2 | 6/2012 | Bennett | |
| 8,271,700 B1 | 9/2012 | Annem et al. | |
| 8,275,897 B2 | 9/2012 | Fallon | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,502,707 B2 | 8/2013 | Fallon | |
| 8,504,710 B2 | 8/2013 | Fallon | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,643,513 B2 | 2/2014 | Fallon | |
| 8,692,695 B2 | 4/2014 | Fallon et al. | |
| 8,717,203 B2 | 5/2014 | Fallon | |
| 8,717,204 B2 | 5/2014 | Fallon et al. | |
| 8,719,438 B2 | 5/2014 | Fallon | |
| 8,723,701 B2 | 5/2014 | Fallon et al. | |
| 8,742,958 B2 | 6/2014 | Fallon et al. | |
| 8,751,463 B1 | 6/2014 | Chamness | |
| 8,756,332 B2 | 6/2014 | Fallon | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,806,062 B1* | 8/2014 | Vertongen | H04L 29/08783 |
| | | | 709/247 |
| 8,812,860 B1 | 8/2014 | Bray | |
| 8,850,546 B1 | 9/2014 | Field et al. | |
| 8,880,862 B2 | 11/2014 | Fallon et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,933,825 B2 | 1/2015 | Fallon | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,054,728 B2 | 6/2015 | Fallon | |
| 9,081,713 B1 | 7/2015 | Bennett | |
| 9,116,908 B2 | 8/2015 | Fallon | |
| 9,124,569 B2 | 9/2015 | Hussain et al. | |
| 9,134,922 B2 | 9/2015 | Rajagopal et al. | |
| 9,141,992 B2 | 9/2015 | Fallon et al. | |
| 9,143,161 B1* | 9/2015 | Greene | H03M 7/30 |
| 9,143,546 B2 | 9/2015 | Fallon et al. | |
| 9,189,334 B2 | 11/2015 | Bennett | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,311,182 B2 | 4/2016 | Bennett | |
| 9,444,822 B1 | 9/2016 | Borowiec et al. | |
| 9,507,532 B1 | 11/2016 | Colgrove et al. | |
| 9,632,870 B2 | 4/2017 | Bennett | |
| 9,667,751 B2 | 5/2017 | Fallon et al. | |
| 9,792,308 B2 | 10/2017 | Fallon et al. | |
| 10,346,043 B2 | 7/2019 | Golden et al. | |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Van Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0038738 A1* | 2/2007 | Iyengar | G06F 11/3466 |
| | | | 709/224 |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0117968 A1* | 5/2008 | Wang | H04N 19/61 |
| | | | 375/240.12 |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0112949 A1* | 4/2009 | Ergan | G06F 12/0802 |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0006948 A1* | 1/2013 | Shmueli | G06F 16/1744 |
| | | | 707/693 |
| 2013/0007845 A1 | 1/2013 | Chang et al. | |
| 2013/0031414 A1 | 1/2013 | Dhuse et al. | |
| 2013/0036272 A1 | 2/2013 | Nelson | |

(56) References Cited

U.S. PATENT DOCUMENTS

| | | | |
|---|---|---|---|
| 2013/0071087 A1 | 3/2013 | Motiwala et al. | |
| 2013/0145447 A1 | 6/2013 | Maron | |
| 2013/0185269 A1* | 7/2013 | Amit | G06F 3/0608 |
| | | | 707/693 |
| 2013/0191555 A1 | 7/2013 | Liu | |
| 2013/0198459 A1 | 8/2013 | Joshi et al. | |
| 2013/0205067 A1 | 8/2013 | Kettner | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0156611 A1* | 6/2014 | Sainath | G06F 16/1744 |
| | | | 707/693 |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0193169 A1 | 7/2015 | Sundaram et al. | |
| 2015/0339059 A1* | 11/2015 | Kang | G06F 3/064 |
| | | | 711/154 |
| 2015/0378888 A1 | 12/2015 | Zhang et al. | |
| 2016/0065241 A1* | 3/2016 | Ichien | H04L 69/04 |
| | | | 710/34 |
| 2016/0098323 A1 | 4/2016 | Mutha et al. | |
| 2016/0098439 A1 | 4/2016 | Dickie et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0185313 A1 | 6/2017 | Golden et al. | |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |
| WO | WO-2017/116553 A1 | 7/2017 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., Secure Data Deduplication, Proceedings of the 4th ACM International Workshop on Storage Security And Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express As The Primary System Interconnect In Multiroot Compute, Storage, Communications And Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

(56) References Cited

OTHER PUBLICATIONS

International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044875, dated Oct. 5, 2016, 13 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.
International Search Report and Written Opinion, PCT/US2016/059757, dated Jan. 17, 2017, 11 pages.

* cited by examiner

OPTIMIZING FOR DATA REDUCTION IN A STORAGE SYSTEM

CROSS-REFERENCE TO RELATED APPLICATION

This application is a continuation application of and claims priority from U.S. Pat. No. 10,346,043, issued Jul. 9, 2019.

BACKGROUND OF THE DISCLOSURE

Field of the Disclosure

The field of the disclosure is data processing, or, more specifically, methods, apparatus, and products for intelligently compressing data in a storage array that includes a plurality of storage devices.

Description of Related Art

Enterprise storage systems frequently include a plurality of storage devices. Each of the storage devices may be capable of storing a particular amount of data, and as such, the storage system as a whole is characterized by the cumulative capacity of the storage devices that make up the storage system. In order to better utilize the capacity of the storage system, data reduction techniques are often applied to reduce the size of the data stored in the storage system. One such technique is data compression. Data compression, however, is frequently carried out in an unsophisticated, non-optimal manner.

SUMMARY OF THE DISCLOSURE

Methods, apparatuses, and products for intelligently compressing data in a storage array that includes a plurality of storage devices, including: prioritizing, in dependence upon an expected benefit to be gained from compressing each data element, one or more data elements; receiving an amount of processing resources available for compressing the one or more of the data elements; and selecting, in dependence upon the prioritization of the one or more data elements and the amount of processing resources available for compressing one or more of the data elements, a data compression algorithm to utilize on one or more of the data elements.

The foregoing and other objects, features and advantages of the disclosure will be apparent from the following more particular descriptions of example embodiments of the disclosure as illustrated in the accompanying drawings wherein like reference numbers generally represent like parts of example embodiments of the disclosure.

DETAILED DESCRIPTION OF EXAMPLE EMBODIMENTS

Figure 1:
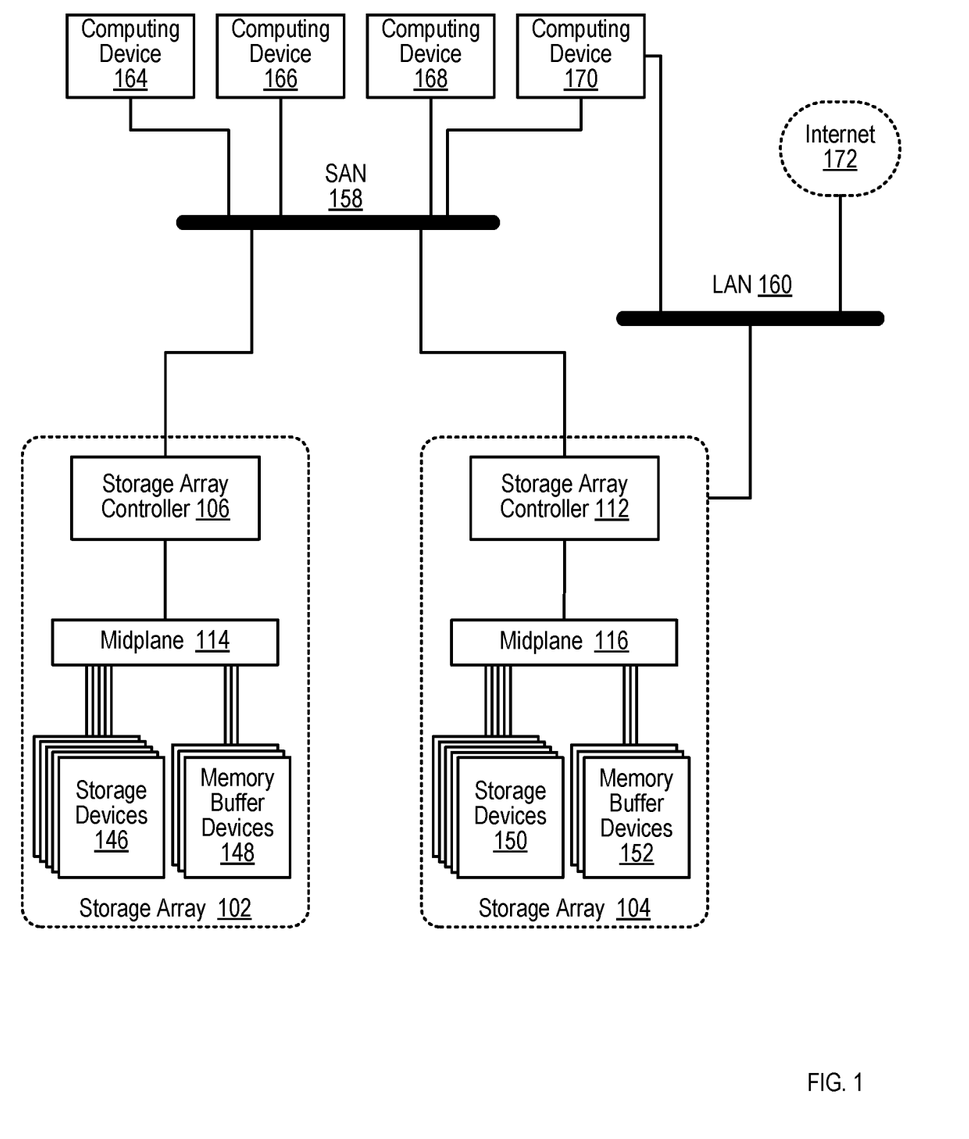
FIG. 1 sets forth a block diagram of a system configured for intelligently compressing data according to embodiments of the present disclosure.

Example methods, apparatuses, and products for intelligently compressing data in a storage array in accordance with the present disclosure are described with reference to the accompanying drawings, beginning with FIG. 1. FIG. 1 sets forth a block diagram of a system configured for intelligently compressing data according to embodiments of the present disclosure. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be useful in intelligently compressing data according to embodiments of the present disclosure. The storage array controllers (106, 112) may assist in intelligently compressing data by prioritizing one or more data elements in dependence upon an expected benefit to be gained from compressing each data element, receiving an amount of processing resources available for compressing the one or more of the data elements, selecting a data compression algorithm to utilize on one or more of the data elements in dependence upon the prioritization of the one or more data elements and the amount of processing resources available for compressing one or more of the data elements, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Intelligently compressing data in a storage array in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in intelligently compressing data in a storage array according to embodiments of the present disclosure.

Figure 2:
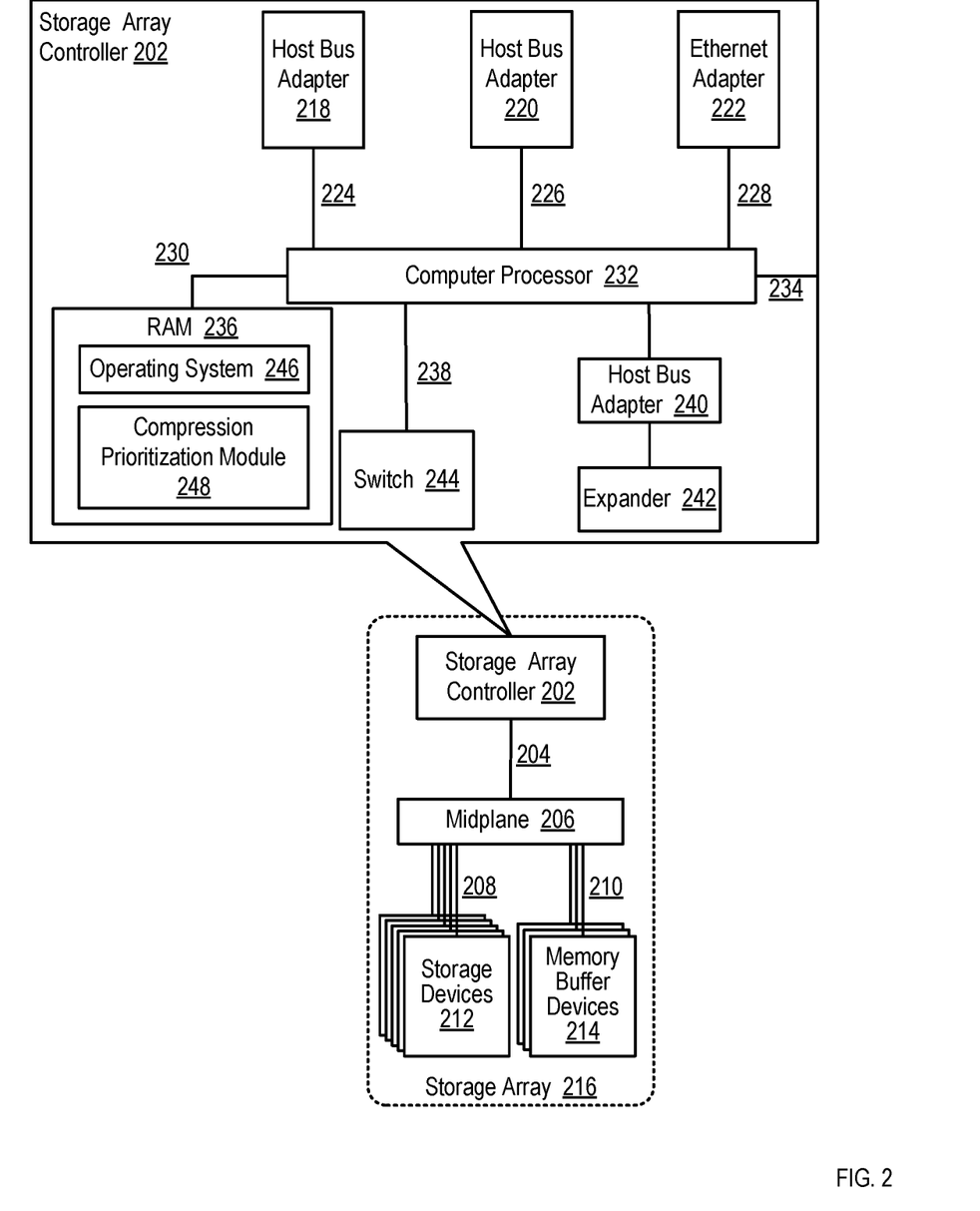
FIG. 2 sets forth a block diagram of a storage array controller useful in intelligently compressing data in a storage array according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory (RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for intelligently compressing data in a storage array according to embodiments of the present disclosure include UNIX™, Linux™, Microsoft Windows™, and others as will occur to those of skill in the art. Also stored in RAM (236) is a compression optimization module (248), a module that includes computer program instructions useful in intelligently compressing data in a storage array that includes a plurality of storage devices according to embodiments of the present disclosure.

The compression optimization module (248) may intelligently compress data in a storage array that includes a plurality of storage devices by: prioritizing, in dependence upon an expected benefit to be gained from compressing each data element, one or more data elements; receiving an amount of processing resources available for compressing the one or more of the data elements; and selecting, in dependence upon the prioritization of the one or more data elements and the amount of processing resources available for compressing one or more of the data elements, a data compression algorithm to utilize on one or more of the data elements, as will be described in greater detail below.

The compression optimization module (248) may further intelligently compress data in a storage array that includes a plurality of storage devices by: determining, for each of the plurality of data elements, an amount of time that the data element is expected to remain stored in the storage array, where the expected benefit is determined in dependence upon the amount of time that the data element is expected to remain stored in the storage array; determining, for each of the plurality of data elements, an expected compression ratio to be achieved by compressing the data element, where the expected benefit is determined in dependence upon the expected compression ratio to be achieved by compressing the data element; determining, for each of the plurality of data elements, an expected amount of time required to uncompress the data element, where the expected benefit is determined in dependence upon the amount of time required to uncompress the data element; determining the amount of processing resources available for compressing one or more of the data elements; and determining, for one or more compression algorithms, an amount of processing resources required to compress one or more of the data elements utilizing the compression algorithm, as will be described in greater detail below.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
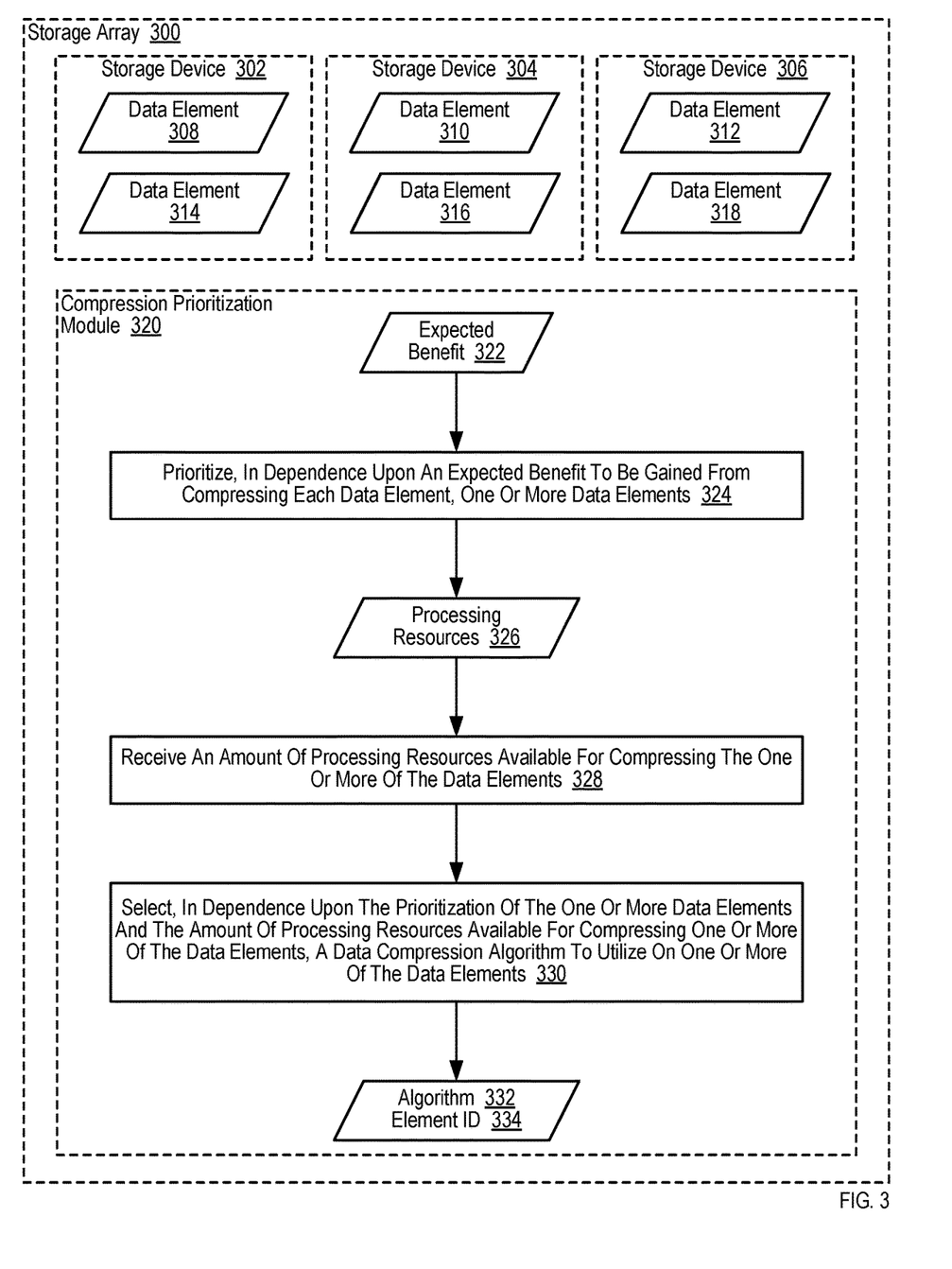
FIG. 3 sets forth a flow chart illustrating an example method for intelligently compressing data in a storage array that includes a plurality of storage devices according to embodiments of the present disclosure.

For further explanation, FIG. 3 sets forth a flow chart illustrating an example method for intelligently compressing data in a storage array (300) that includes a plurality of storage devices (302, 304, 306) according to embodiments of the present disclosure. Although depicted in less detail, the storage array (300) of FIG. 3 may be similar to the storage arrays described above with reference to FIG. 1. The storage array (300) can include a plurality of storage devices (302, 304, 306), each of which is depicted as storing multiple data elements (308, 310, 312, 314, 316, 318). Each of the data elements (308, 310, 312, 314, 316, 318) can represent some unit of data such as, for example, the data stored within an address range of a storage device (302, 304, 306), the data stored within a fixed size unit (e.g., a block, a page) of storage on the storage device (302, 304, 306), a logical grouping of data such as the contents of a particular file, and so on.

The example method depicted in FIG. 3 is carried out, at least in part, by a compression prioritization module (320). The compression prioritization module (320) may be embodied, for example, as a module of computer software executing on computer hardware such as a computer processor. The compression prioritization module (320) may be executing, for example, on a storage array controller such as the storage array controllers that are described above with reference to FIG. 1 and FIG. 2.

The example method depicted in FIG. 3 includes prioritizing (324), in dependence upon an expected benefit (322) to be gained from compressing each data element (308, 310, 312, 314, 316, 318), one or more data elements (308, 310, 312, 314, 316, 318). In the example method depicted in FIG. 3, the expected benefit (322) to be gained from compressing each data element (308, 310, 312, 314, 316, 318) may be a function of many factors. For example, the expected benefit (322) to be gained from compressing each data element (308, 310, 312, 314, 316, 318) may be a function of the expected compression ratio of each data element (308, 310, 312, 314, 316, 318) as data elements with a higher compression ratio may be associated with a higher expected benefit (322) than data elements with a lower compression ratio. The expected benefit (322) to be gained from compressing each data element (308, 310, 312, 314, 316, 318) may also be a function of how long each data element is expected to remain stored within the storage array, as data elements that are expected to be stored on the storage array for a relatively long period of time may be associated with a higher expected benefit (322) than data elements that are expected to be stored on the storage array for a relatively short period of time. Readers will appreciate that the expected benefit (322) to be gained from compressing each data element (308, 310, 312, 314, 316, 318) may be a function of many additional factors, and that multiple factors may be taken into account in a weighted or unweighted manner. Readers will further appreciate that, although not expressly depicted in FIG. 3, the expected benefit (322) to be gained from compressing each data element (308, 310, 312, 314, 316, 318) may be calculated by the compression prioritization module (320) or calculated by another module and received by the compression prioritization module (320).

In the example method depicted in FIG. 3, prioritizing (324) one or more data elements (308, 310, 312, 314, 316, 318) may be carried out, for example, by ranking the data elements (308, 310, 312, 314, 316, 318) in dependence upon the expected benefit (322) to be gained from compressing each data element (308, 310, 312, 314, 316, 318), by segmenting the data elements (308, 310, 312, 314, 316, 318) into groups (e.g., top 10%, top 25%) in dependence upon the expected benefit (322) to be gained from compressing each data element (308, 310, 312, 314, 316, 318), by assigning a score to each data element (308, 310, 312, 314, 316, 318) in dependence upon the expected benefit (322) to be gained from compressing the data element (308, 310, 312, 314, 316, 318), and so on. Readers will appreciate that by prioritizing (324) one or more data elements (308, 310, 312, 314, 316, 318), limited compression resources such as a CPU cycles can be allocated to compressing those data elements (308, 310, 312, 314, 316, 318) with the greatest expected benefit (322) to be gained from compression, rather than utilizing such limited compression resources to compress data elements whose compression is less beneficial.

Readers will appreciate that prioritizing (324) one or more data elements (308, 310, 312, 314, 316, 318) in dependence upon the expected benefit (322) to be gained from compressing each data element (308, 310, 312, 314, 316, 318) may be carried out for multiple compression algorithms. In fact, given that one compression algorithm may produce greater expected benefits for one type of data and another compression algorithm may produce greater expected benefits for one type of data, the one or more data elements (308, 310, 312, 314, 316, 318) may be prioritized differently for different compression algorithms. For example, assume that the expected compression ratio for the six data elements (308, 310, 312, 314, 316, 318) depicted in FIG. 1 is as follows:

TABLE 1

Expected Compression Ratio

| Data Element ID | Compression Algorithm 1 Compression Ratio | Compression Algorithm 2 Compression Ratio |
|---|---|---|
| 308 | 2.2:1 | 3.1:1 |
| 310 | 2.4:1 | 3.0:1 |
| 312 | 2.0:1 | 3.6:1 |
| 314 | 2.5:1 | 3.4:1 |
| 316 | 1.9:1 | 2.9:1 |
| 318 | 1.7:1 | 2.8:1 |

In the example depicted in Table 1, utilizing only the expected compression ratio to determine the expected benefit to be gained by compressing each data element, a different prioritization of the data elements would result if compression algorithm 1 was selected versus selecting compression algorithm 2. Readers will appreciate that while compression algorithm 2 generally produces greater data reduction than compression algorithm 1, other factors (e.g., the amount of CPU cycles required to apply each compression algorithm, the amount of time required to apply each compression algorithm, and so on) may ultimately lead to applying compression algorithm 1 rather than compression algorithm 2, as will be described in more detail below.

The example method depicted in FIG. 3 also includes receiving (328) an amount of processing resources (326) available for compressing the one or more of the data elements (308, 310, 312, 314, 316, 318). The amount of processing resources (326) available for compressing one or more of the data elements (308, 310, 312, 314, 316, 318) may be expressed in terms of a number of CPU cycles that may be utilized for compressing one or more of the data elements (308, 310, 312, 314, 316, 318), as a percentage of time that a CPU may be utilized for compressing one or more of the data elements (308, 310, 312, 314, 316, 318), and so on. Readers will appreciate that the amount of processing resources (326) that available for compressing the one or more of the data elements (308, 310, 312, 314, 316, 318) may be determined by a system scheduler or entity tasked with allocating processing resources between many consumers of such resources. As such, the amount of processing resources (326) available for compressing one or more of the data elements (308, 310, 312, 314, 316, 318) may change over time as other consumers of such processing resources demand more or less processing resources. For example, the amount of processing resources (326) available for compressing one or more of the data elements (308, 310, 312, 314, 316, 318) may be relatively low when the storage array (300) is servicing a relatively large number of I/O operations and the amount of processing resources (326) available for compressing one or more of the data elements (308, 310, 312, 314, 316, 318) may be relatively high when the storage array (300) is servicing a relatively small number of I/O operations.

The example method depicted in FIG. 3 also includes selecting (330), in dependence upon the prioritization of the one or more data elements (308, 310, 312, 314, 316, 318) and the amount of processing resources (326) available for compressing one or more of the data elements (308, 310, 312, 314, 316, 318), a data compression algorithm (332) to utilize on one or more of the data elements (308, 310, 312, 314, 316, 318). Examples of a data compression algorithm (332) can include Lempel-Ziv algorithms, Burrows-Wheeler transform algorithms, dictionary coder algorithms, and many others.

Selecting (330) a data compression algorithm (332) to utilize on one or more of the data elements (308, 310, 312, 314, 316, 318) may be carried out, for example, by selecting the combination of a data compression algorithm (332) and one or more of the data elements (308, 310, 312, 314, 316, 318) that are to be compressed using the data compression algorithm (332) that yields the largest cumulative expected benefit. Readers will appreciate, however, that the combination of a data compression algorithm (332) and one or more of the data elements (308, 310, 312, 314, 316, 318) that are to be compressed using the data compression algorithm (332) may only be selected when the selected data elements (308, 310, 312, 314, 316, 318) may be compressed using the selected data compression algorithm (332) by utilizing an amount of processing resources that are equal to or less than the processing resources (326) that are available for compressing one or more of the data elements (308, 310, 312, 314, 316, 318). Continuing with the example described in Table 1, assume that compressing each data element requires the following amount of processing resources.

TABLE 2

Expected Compression Ratio

| Data Element ID | Compression Algorithm 1 Compression Ratio | CPU Cycles Required | Compression Algorithm 2 Compression Ratio | CPU Cycles Required |
|---|---|---|---|---|
| 308 | 2.3:1 | 100 | 3.1:1 | 150 |
| 310 | 2.4:1 | 100 | 3.0:1 | 150 |
| 312 | 2.0:1 | 100 | 3.6:1 | 150 |
| 314 | 2.5:1 | 100 | 3.4:1 | 150 |

TABLE 2-continued

Expected Compression Ratio

| Data Element ID | Compression Algorithm 1 Compression Ratio | CPU Cycles Required | Compression Algorithm 2 Compression Ratio | CPU Cycles Required |
|---|---|---|---|---|
| 316 | 1.9:1 | 100 | 2.9:1 | 150 |
| 318 | 1.7:1 | 100 | 2.8:1 | 150 |

In the example depicted above, assume that each data element is 10 MB in size and that the amount of processing resources (326) available for compressing the one or more of the data elements (308, 310, 312, 314, 316, 318) that was received (328) is 300 processing cycles. In such an example, three data elements (314, 310, 308) could be compressed using compression algorithm 1 within the amount of processing resources (326) available for compressing the data elements. The total amount of space saved by compressing the three highest priority data elements (314, 310, 308) using compression algorithm 1 would be 17.5 MB. In this example, only two data elements (312, 314) could be compressed using compression algorithm 2 within the amount of processing resources (326) available for compressing the data elements. The total amount of space saved by compressing the two highest priority data elements (312, 314) using compression algorithm 2 would be 14.3 MB. As such, the greatest cumulative benefit would be achieved by selecting (330) to compress data elements (314, 310, 308) with compression algorithm 1.

Readers will appreciate that although the example described above includes data elements that are equally sized, this is not included as a limitation. In fact, data elements may be quite disparate in size but the concepts described above may still apply. Readers will further appreciate that although the example described above includes only a single consideration (data reduction), multiple considerations may be taken into account and each consideration may be given equal or unequal weightings according to embodiments of the present disclosure.

Figure 4:
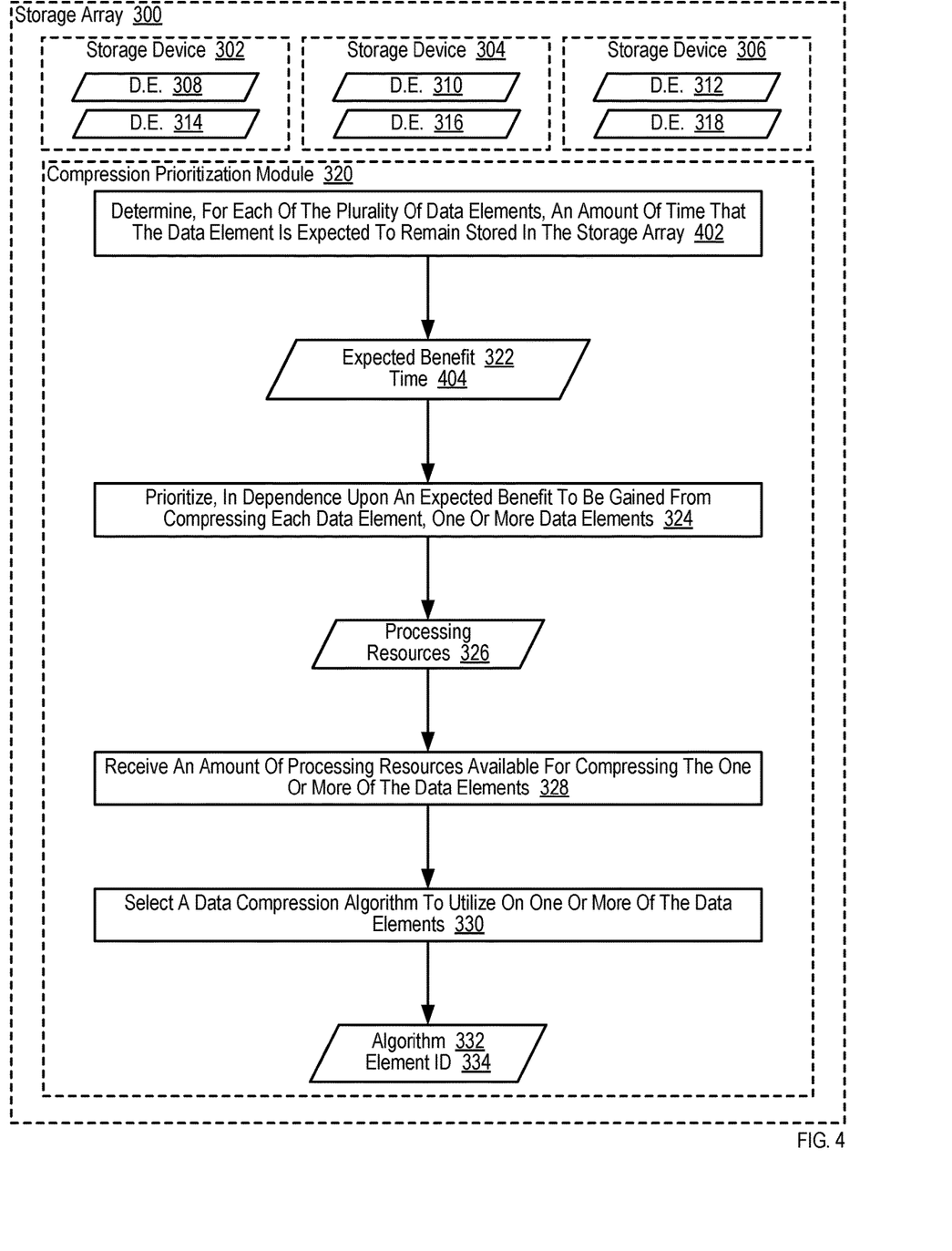
FIG. 4 sets forth a flow chart illustrating a further example method for intelligently compressing data in a storage array that includes a plurality of storage devices according to embodiments of the present disclosure.

For further explanation, FIG. 4 sets forth a flow chart illustrating a further example method for intelligently compressing data in a storage array (300) that includes a plurality of storage devices (302, 304, 306) according to embodiments of the present disclosure. The example method depicted in FIG. 4 is similar to the example method depicted in FIG. 3, as the example method depicted in FIG. 4 also includes prioritizing (324) one or more data elements (308, 310, 312, 314, 316, 318), receiving (328) an amount of processing resources (326) available for compressing the one or more of the data elements (308, 310, 312, 314, 316, 318), and selecting (330) a data compression algorithm (332) to utilize on one or more of the data elements (308, 310, 312, 314, 316, 318).

The example method depicted in FIG. 4 also includes determining (402), for each of the plurality of data elements (308, 310, 312, 314, 316, 318), an amount of time (404) that the data element (308, 310, 312, 314, 316, 318) is expected to remain stored in the storage array (300). The amount of time (404) that the data element (308, 310, 312, 314, 316, 318) is expected to remain stored in the storage array (300) may be determined (402) based on a large number of factors. One factor utilized to determine (402) the amount of time (404) that the data element (308, 310, 312, 314, 316, 318) is expected to remain stored in the storage array (300) may be the type of application that has stored the data element in the storage array (300). For example, data elements that are stored by word processing applications may be expected to be stored on storage array (300) for shorter periods of time than data elements stored on storage array (300) by database applications. Another factor utilized to determine (402) the amount of time (404) that the data element (308, 310, 312, 314, 316, 318) is expected to remain stored in the storage array (300) may be statistical information that identifies hot and cold memory regions of the storage array (300). For example, data elements that are stored in heavily accessed memory regions may be expected to be stored on storage array (300) for shorter periods of time than data elements that are stored in less heavily accessed memory regions. An additional factor utilized to determine (402) the amount of time (404) that the data element (308, 310, 312, 314, 316, 318) is expected to remain stored in the storage array (300) may be the current amount of time that the data element has been stored on the storage array (300), as data elements may exhibit behaviors where the data elements tend to have very long lifespans once they have been stored for more than a threshold period of time. Readers that other factors such as, for example, the size of the data element, the data type of the data element, the historical behavior of a user that caused the data element to be stored in the storage array (300), the number of users that are currently utilizing the data element, and many other factors may be used to determine (402) the amount of time (404) that the data element (308, 310, 312, 314, 316, 318) is expected to remain stored in the storage array (300). Readers will appreciate that such factors may be utilized in combination, in a weighted or unweighted manner, to determine (402) the amount of time (404) that the data element (308, 310, 312, 314, 316, 318) is expected to remain stored in the storage array (300).

In the example method depicted n FIG. 4, the expected benefit (322) is determined in dependence upon the amount of time (404) that the data element (308, 310, 312, 314, 316, 318) is expected to remain stored in the storage array (300). The expected benefit (322) may be solely a function of the amount of time (404) that the data element (308, 310, 312, 314, 316, 318) is expected to remain stored in the storage array (300). Alternatively, the expected benefit (322) may be a function of the amount of time (404) that the data element (308, 310, 312, 314, 316, 318) is expected to remain stored in the storage array (300), as well as other considerations mentioned above such as an expected compression ratio, an expected amount of time required to decompress a data element, and so on. In such an example, the expected benefit (322) may be determined by utilizing a predetermined formula that utilizes the amount of time (404) that the data element (308, 310, 312, 314, 316, 318) is expected to remain stored in the storage array (300) and any other appropriate considerations as inputs.

Figure 5:
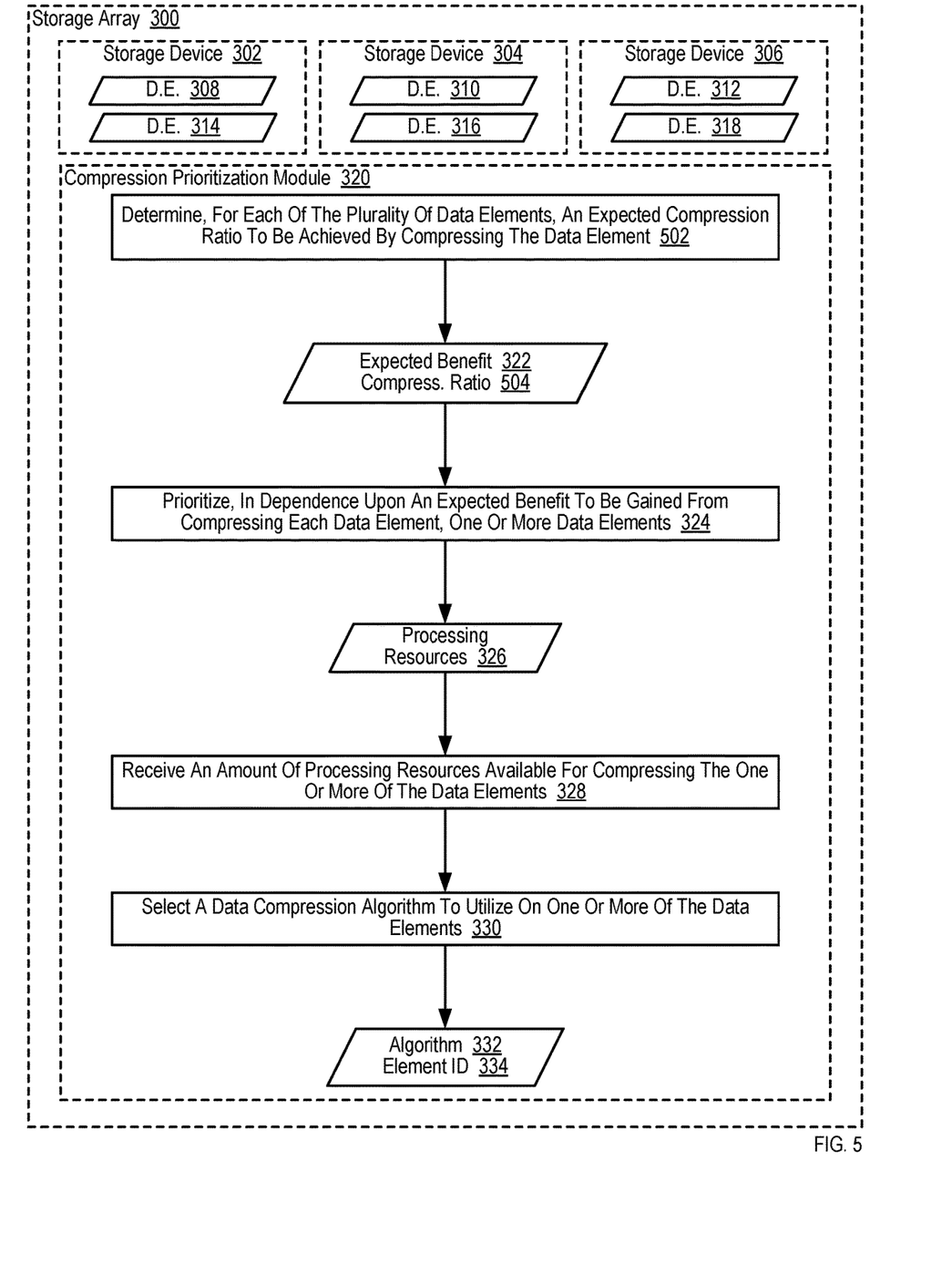
FIG. 5 sets forth a flow chart illustrating a further example method for intelligently compressing data in a storage array that includes a plurality of storage devices according to embodiments of the present disclosure.

For further explanation, FIG. 5 sets forth a flow chart illustrating a further example method for intelligently compressing data in a storage array (300) that includes a plurality of storage devices (302, 304, 306) according to embodiments of the present disclosure. The example method depicted in FIG. 5 is similar to the example method depicted in FIG. 3, as the example method depicted in FIG. 4 also includes prioritizing (324) one or more data elements (308, 310, 312, 314, 316, 318), receiving (328) an amount of processing resources (326) available for compressing the one or more of the data elements (308, 310, 312, 314, 316, 318), and selecting (330) a data compression algorithm (332) to utilize on one or more of the data elements (308, 310, 312, 314, 316, 318).

The example method depicted in FIG. 5 also includes determining (502), for each of the plurality of data elements (308, 310, 312, 314, 316, 318), an expected compression ratio (504) to be achieved by compressing the data element. In the example method depicted in FIG. 5, the expected compression ratio (504) can include a quantifiable value that represents the reduction in data-representation size produced by a data compression algorithm. The expected compression ratio (504) can be calculated as the ratio between the uncompressed size of a particular data element and the compressed size of the same data element. In the example method depicted in FIG. 5, the expected compression ratio (504) to be achieved by compressing the data element may be determined (502) based on a large number of factors. One factor that may be used to determine (502) the expected compression ratio (504) can include the historical performance of a particular compression algorithm. For example, if a particular compression algorithm has historically produced a compression ratio of 3:1 while another compression algorithm has historically produced a compression ratio of 4:1, the expected compression ratio (504) to be achieved by compressing the data element may be determined (502) to be consistent with the historical performance of each compression algorithm. Another factor that may be used to determine (502) the expected compression ratio (504) can include the historical performance of particular types of data elements. For example, if data elements of a particular size have historically resulted in a particular compression ratio, if data elements of a stored on the storage array (300) by a particular type of application have historically resulted in a particular compression ratio, the expected compression ratio (504) to be achieved by compressing the data element may be determined (502) to be consistent with the historical performance of similar data elements. Readers will appreciate that such factors may be utilized in combination, in a weighted or unweighted manner, to determine (502) an expected compression ratio (504) to be achieved by compressing each data element (308, 310, 312, 314, 316, 318).

In the example method depicted in FIG. 5, the expected benefit (322) is determined in dependence upon the expected compression ratio (504) to be achieved by compressing the data element (308, 310, 312, 314, 316, 318). The expected benefit (322) may be solely a function of the expected compression ratio (504) to be achieved by compressing the data element (308, 310, 312, 314, 316, 318). Alternatively, the expected benefit (322) may be a function of the expected compression ratio (504) to be achieved by compressing the data element (308, 310, 312, 314, 316, 318), as well as other considerations mentioned above such as the amount of time that the data element is expected to remain stored on the storage array (300), the amount of time required to decompress a particular data element, and so on. In such an example, the expected benefit (322) may be determined by utilizing a predetermined formula that utilizes the expected compression ratio (504) to be achieved by compressing the data element (308, 310, 312, 314, 316, 318) and any other appropriate considerations as inputs.

Figure 6:
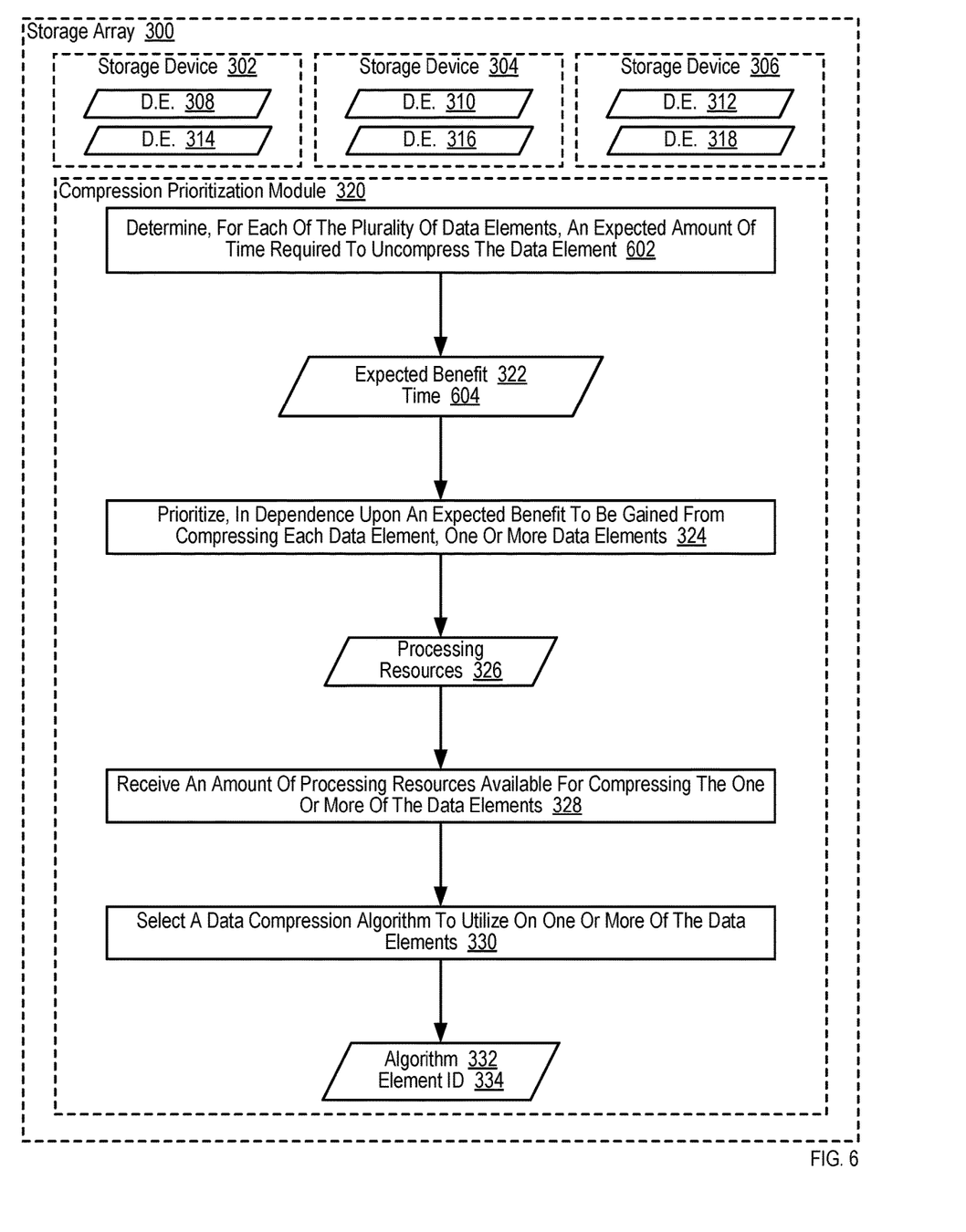
FIG. 6 sets forth a flow chart illustrating a further example method for intelligently compressing data in a storage array that includes a plurality of storage devices according to embodiments of the present disclosure.

For further explanation, FIG. 6 sets forth a flow chart illustrating a further example method for intelligently compressing data in a storage array (300) that includes a plurality of storage devices (302, 304, 306) according to embodiments of the present disclosure. The example method depicted in FIG. 6 is similar to the example method depicted in FIG. 3, as the example method depicted in FIG. 4 also includes prioritizing (324) one or more data elements (308, 310, 312, 314, 316, 318), receiving (328) an amount of processing resources (326) available for compressing the one or more of the data elements (308, 310, 312, 314, 316, 318), and selecting (330) a data compression algorithm (332) to utilize on one or more of the data elements (308, 310, 312, 314, 316, 318).

The example method depicted in FIG. 6 also includes determining (602), for each of the plurality of data elements (308, 310, 312, 314, 316, 318), an expected amount of time (604) required to uncompress the data element may be based on a large number of factors. One factor that may be used to determine (602) the expected amount of time (604) required to uncompress the data element can include the historical performance of a particular compression algorithm. For example, if a particular compression algorithm has historically uncompressed data elements at a first rate when another compression algorithm has historically uncompressed data elements at a second rate, the expected amount of time (604) required to uncompress the data element may be determined (602) to be consistent with the historical performance of each compression algorithm. Another factor that may be used to determine (602) expected amount of time (604) required to uncompress the data element can include the historical performance of particular types of data elements. For example, if data elements of a particular size have historically been uncompressed at a certain rate, if data elements of a stored on the storage array (300) by a particular type of application have historically uncompressed at a certain rate, the expected amount of time (604) required to uncompress the data element may be determined (602) to be consistent with the historical performance of similar data elements. Readers will appreciate that such factors may be utilized in combination, in a weighted or unweighted manner, to determine (602) expected amount of time (604) required to uncompress each data element (308, 310, 312, 314, 316, 318).

In the example method depicted in FIG. 6, the expected benefit (322) is determined in dependence upon the expected amount of time required to uncompress the data element. The expected benefit (322) may be solely a function of the expected amount of time required to uncompress the data element (308, 310, 312, 314, 316, 318). Alternatively, the expected benefit (322) may be a function of the expected amount of time required to uncompress the data element (308, 310, 312, 314, 316, 318), as well as other considerations mentioned above such as the amount of time that the data element is expected to remain stored on the storage array (300), the expected compression ratio to be achieved for a particular data element, and so on. In such an example, the expected benefit (322) may be determined by utilizing a predetermined formula that utilizes the expected amount of time required to uncompress the data element (308, 310, 312, 314, 316, 318) and any other appropriate considerations as inputs.

Figure 7:
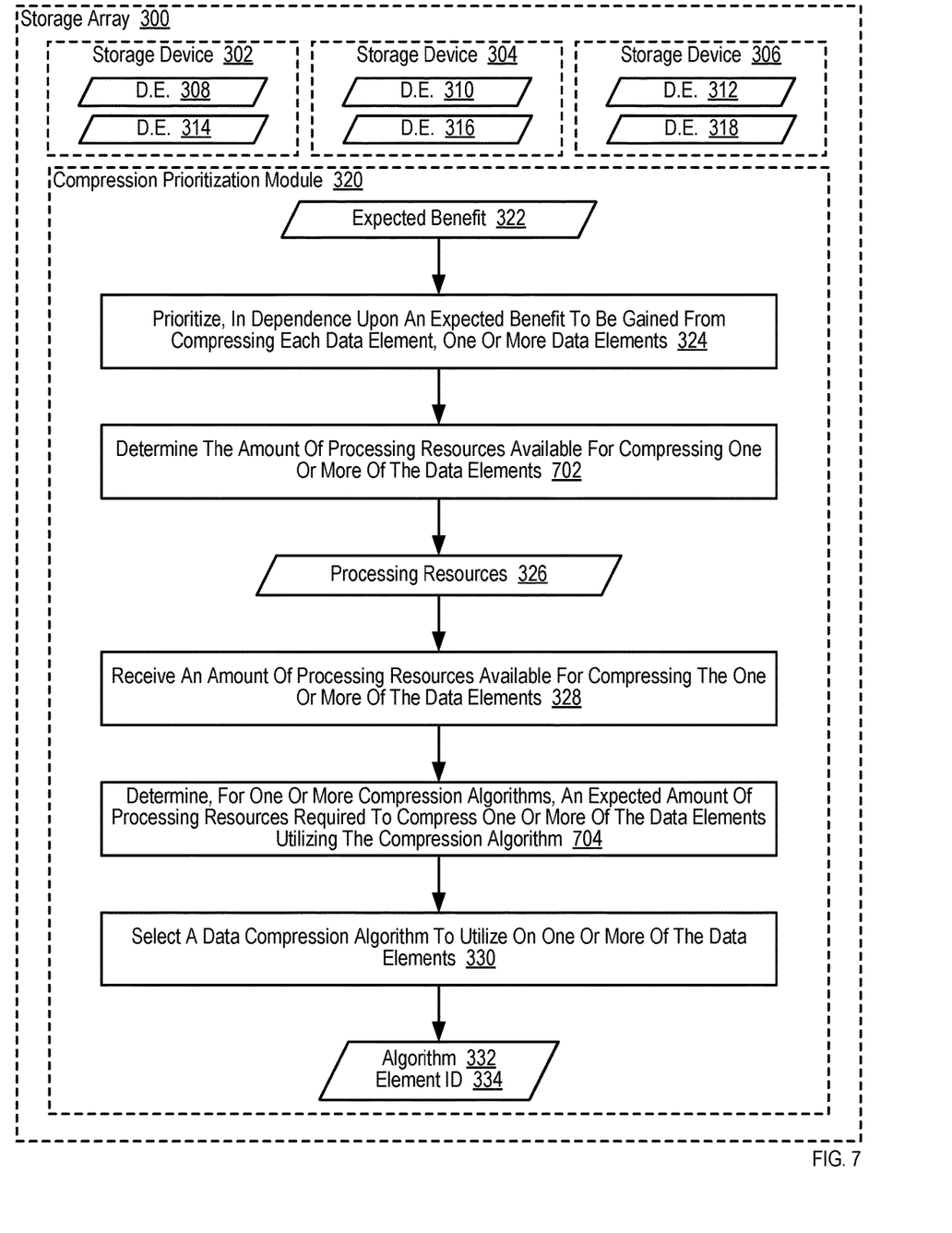
FIG. 7 sets forth a flow chart illustrating a further example method for intelligently compressing data in a storage array that includes a plurality of storage devices according to embodiments of the present disclosure.

For further explanation, FIG. 7 sets forth a flow chart illustrating a further example method for intelligently compressing data in a storage array (300) that includes a plurality of storage devices (302, 304, 306) according to embodiments of the present disclosure. The example method depicted in FIG. 7 is similar to the example method depicted in FIG. 3, as the example method depicted in FIG. 4 also includes prioritizing (324) one or more data elements (308, 310, 312, 314, 316, 318), receiving (328) an amount of processing resources (326) available for compressing the one or more of the data elements (308, 310, 312, 314, 316, 318), and selecting (330) a data compression algorithm (332) to utilize on one or more of the data elements (308, 310, 312, 314, 316, 318).

The example method depicted in FIG. 7 also includes determining (702) the amount of processing resources available for compressing one or more of the data elements (308, 310, 312, 314, 316, 318). The amount of processing resources available for compressing one or more of the data elements (308, 310, 312, 314, 316, 318) may be determined (702), for example, in dependence upon the amount of I/O operations currently being serviced by the storage array (300) the amount of processing resources may be made available for compressing the data elements may increase as the amount of I/O operations currently being serviced by the storage array (300). Alternatively, the amount of processing resources available for compressing one or more of the data elements (308, 310, 312, 314, 316, 318) may be determined (702) in dependence upon a schedule, as the amount of processing resources made available for compressing the data elements may increase during time periods of historically low system utilization whereas the amount of processing resources made available for compressing the data elements may decrease during time periods of historically high system utilization. In such a way, the amount of processing resources that are made available for compressing one or more of the data elements (308, 310, 312, 314, 316, 318) may be determined (702) by taking the processing needs of other tasks and components into consideration.

The example method depicted in FIG. 7 also includes determining (704), for one or more compression algorithms, an expected amount of processing resources required to compress one or more of the data elements utilizing the compression algorithm. Readers will appreciate that different processing algorithms may require a different amount of processing resources to compress the same data element. For example, a first compression algorithm that performs relatively light compression may require a smaller amount of processing resources to compress a data element than a second compression algorithm that performs relatively deep compression. In such an example, the second compression algorithm may also achieve a higher compression ratio than the first compression algorithm, thereby creating a situation where tradeoffs must be made between achieving superior data reduction and conserving processing resources. In the example method depicted in FIG. 7, determining (704) an expected amount of processing resources required to compress one or more of the data elements utilizing a particular processing algorithm may be carried out, for example, based on the amount of processing resources historically required to compress similarly sized data elements using the particular processing algorithm, based on the amount of processing resources historically required to compress data elements of the same type as a target data element using the particular processing algorithm, and so on.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
    selecting, from one or more data elements stored at a storage system, a subset of data elements based on an expected amount of time for the storage system to decompress each data element of the one or more of data elements; and
    compressing the subset of the data elements, wherein the subset of the data elements does not include all of the one or more data elements.

2. The method of claim 1 further comprising determining, for one or more compression algorithms, an amount of processing resources required to compress one or more of the data elements utilizing the compression algorithm, wherein the selecting the subset of data elements is further based on the amount of processing resources required to compress one or more of the data elements.

3. The method of claim 2 further comprising selecting, from amongst a plurality of compression algorithms and in dependence upon the amount of processing resources required to compress one or more of the data elements utilizing each compression algorithm, a compression algorithm to utilize to compress the subset of the data elements.

4. The method of claim 1, wherein the selecting the subset of data elements is further based on an expected compression ratio of each data element of the one or more data elements in dependence upon historical performance of a particular compression algorithm.

5. The method of claim 1 wherein the selecting the subset of data elements is further based on an expected compression ratio of each data element of the one or more data elements in dependence upon historical performance of particular types of data elements.

6. The method of claim 1 further comprising ranking one or more data elements in dependence upon an expected data compression value for each of a plurality of data elements.

7. The method of claim 6 wherein the subset of data elements are selected based on the ranking.

8. A storage system that includes a plurality of storage devices, wherein the storage system includes computer program instructions that, when executed, cause the storage system to carry out the steps of:
    selecting, from one or more data elements stored at a storage system, a subset of data elements based on an expected amount of time for the storage system to decompress each data element of the one or more of data elements; and
    compressing the subset of the data elements, wherein the subset of the data elements does not include all of the one or more data elements.

9. The storage system of claim 8 further comprising computer program instructions that, when executed, cause the storage system to carry out the step of determining, for one or more compression algorithms, an amount of processing resources required to compress one or more of the data elements utilizing the compression algorithm wherein the selecting the subset of data elements is further based on the amount of processing resources required to compress one or more of the data elements.

10. The storage system of claim 9 further comprising computer program instructions that, when executed, cause the storage system to carry out the step of selecting, from amongst a plurality of compression algorithms and in dependence upon the amount of processing resources required to compress one or more of the data elements utilizing each compression algorithm, a compression algorithm to utilize to compress the subset of the data elements.

11. The storage system of claim 8 wherein the selecting the subset of data elements is further based on an expected compression ratio of each data element of the one or more data elements in dependence upon historical performance of a particular compression algorithm.

12. The storage system of claim 8 wherein the selecting the subset of data elements is further based on an expected compression ratio of each data element of the one or more data elements in dependence upon historical performance of particular types of data elements.

13. The storage system of claim 8 further comprising computer program instructions that, when executed, cause the storage system to carry out the step of ranking one or more data elements in dependence upon an expected data compression value for each of a plurality of data elements.

14. The storage system of claim 13 wherein the subset of data elements are selected based on the ranking.

15. A non-transitory computer readable storage medium storing computer program instructions that, when executed, carry out the steps of:
selecting, from one or more data elements stored at a storage system, a subset of data elements based on an expected amount of time for the storage system to decompress each data element of the one or more of data elements; and
compressing the subset of the data elements, wherein the subset of the data elements does not include all of the one or more data elements.

16. The non-transitory computer readable storage medium as recited in claim 15, wherein the computer program instructions are further configured, when executed, to carry out the step of determining, for one or more compression algorithms, an amount of processing resources required to compress one or more of the data elements utilizing the compression algorithm wherein the selecting the subset of data elements is further based on the amount of processing resources required to compress one or more of the data elements.

17. The non-transitory computer readable storage medium as recited in claim 16, wherein the computer program instructions are further configured, when executed, to carry out the step of selecting, from amongst a plurality of compression algorithms and in dependence upon the amount of processing resources required to compress one or more of the data elements utilizing each compression algorithm, a compression algorithm to utilize to compress the subset of the data elements.

18. The non-transitory computer readable storage medium as recited in claim 15, wherein the selecting the subset of data elements is further based on an expected compression ratio of each data element of the one or more data elements in dependence upon historical performance of a particular compression algorithm.

19. The non-transitory computer readable storage medium as recited in claim 15, wherein the selecting the subset of data elements is further based on an expected compression ratio of each data element of the one or more data elements in dependence upon historical performance of particular types of data elements.

\* \* \* \* \*